(12) United States Patent  
Waldrep

(10) Patent No.: US 7,725,875 B2  
(45) Date of Patent: May 25, 2010

(54) AUTOMATED WORLD WIDE WEB NAVIGATION AND CONTENT EXTRACTION

(75) Inventor: Troy S. Waldrep, Austin, TX (US)

(73) Assignee: Pervasive Software, Inc., Austin, TX (US)

( * ) Notice: Subject to any disclaimer, the term of this patent is extended or adjusted under 35 U.S.C. 154(b) by 1034 days.

(21) Appl. No.: 10/655,326

(22) Filed: Sep. 4, 2003

(65) Prior Publication Data

US 2006/0282409 A1    Dec. 14, 2006

(51) Int. Cl.
- G06F 9/44 (2006.01)
- G06F 17/30 (2006.01)
- G06F 15/16 (2006.01)
- G06F 15/173 (2006.01)

(52) U.S. Cl. ............... 717/106; 717/104; 707/709; 709/217; 709/239

(58) Field of Classification Search ........ 717/104, 717/106; 707/709
See application file for complete search history.

(56) References Cited

U.S. PATENT DOCUMENTS

| | | | |
|---|---|---|---|
| 6,209,007 B1 * | 3/2001 | Kelley et al. | 715/513 |
| 6,253,367 B1 * | 6/2001 | Tran et al. | 717/108 |
| 6,538,673 B1 * | 3/2003 | Maslov | 715/853 |
| 6,665,658 B1 * | 12/2003 | DaCosta et al. | 707/3 |
| 6,681,217 B1 * | 1/2004 | Lewak | 707/3 |
| 6,857,124 B1 * | 2/2005 | Doyle | 719/316 |
| 6,976,210 B1 * | 12/2005 | Silva et al. | 715/513 |
| 6,976,216 B1 * | 12/2005 | Peskin et al. | 715/716 |
| 7,047,318 B1 * | 5/2006 | Svedloff | 709/246 |
| 2002/0073119 A1 * | 6/2002 | Richard | 707/513 |
| 2002/0143821 A1 * | 10/2002 | Jakubowski | 707/522 |
| 2002/0198720 A1 * | 12/2002 | Takagi et al. | 704/270.1 |
| 2003/0009430 A1 * | 1/2003 | Burkey et al. | 707/1 |
| 2003/0028563 A1 * | 2/2003 | Stutz et al. | 707/513 |
| 2003/0046311 A1 * | 3/2003 | Baidya et al. | 707/200 |
| 2004/0143569 A1 * | 7/2004 | Gross et al. | 707/3 |
| 2004/0187136 A1 * | 9/2004 | Bhogal et al. | 719/311 |
| 2005/0022115 A1 * | 1/2005 | Baumgartner et al. | 715/513 |

OTHER PUBLICATIONS

"XML Path Language (XPath)", Nov. 16, 1999, World Wide Web Consortiom (W3C), Technical specification, Version 1.0, 37 pages.*

(Continued)

*Primary Examiner*—James Rutten  
(74) *Attorney, Agent, or Firm*—Charles D. Huston; Daffer McDaniel, LLP

(57) ABSTRACT

Storage mediums and a computer-implemented method for automating web navigation and content extraction are provided. In particular, a storage medium with program components which are executable through a common application program interface and are utilizable by a developer to write programming instructions is provided. In some cases, the storage medium may include a program component for adaptively navigating through one or more websites and another program component for extracting scripted content from the one or more websites. In addition or alternatively, the storage medium may include a program component for standardizing content on a web page. In some cases, the storage medium may be configured to allow a user to include XPath query language in program instructions written from the storage medium. A storage medium comprising program instructions executable using a processor for performing such functions and a computer-implemented method employing such processes are also provided herein.

18 Claims, 2 Drawing Sheets

OTHER PUBLICATIONS

Davulcu, H., Freire, J., Kifer, M., and Ramakrishnan, I. V. 1999. A layered architecture for querying dynamic Web content. In Proceedings of the 1999 ACM SIGMOD international Conference on Management of Data (Philadelphia, Pennsylvania, United States, May 31-Jun. 3, 1999). SIGMOD '99. ACM Press, New York, NY, 491-502.*

Flanagan, "JavaScript: The Definitive Guide" Nov. 1 2001, O'Reilly, $4^{th}$ Edition, Section 1.5.*

Myllymaki, "Effective Web data extraction with standard XML technologies," Computer Networks, vol. 39, No. 5, Aug. 2002, pp. 635-644.

International Search Report, PCT/US2004/028851, mailed Nov. 2, 2005.

* cited by examiner

AUTOMATED WORLD WIDE WEB NAVIGATION AND CONTENT EXTRACTION

BACKGROUND OF THE INVENTION

1. Field of the Invention

This invention generally relates to world wide web navigation and content extraction and, more specifically, to methods and systems for automating such processes.

2. Description of the Related Art

The amount of information on the world wide web has increased dramatically in the past several years. Many individuals and organizations use such a resource for gathering information. Unfortunately, harvesting information from the world wide web is typically a time consuming process. In particular, collecting information from the world wide web often involves manually navigating through sites and extracting information by copying the information via manual data reentry and/or cut and paste features. In some cases, custom applications can be written to automate the collection process. However, the development of such codes is time consuming. In particular, the development of custom applications typically involves a great deal of analysis to outline the navigational routes through a website and the steps needed to query and extract content from the website. In addition to being time consuming to prepare, custom applications are generally complex to write and, therefore, typically require one or more skillful programmers. In cases in which the content is not formatted in the industry standard layout, the script will further need to outline steps to convert the content to the standard layout so that the material may be interpreted correctly. Such a conversion will further complicate the application code, consuming more of the programmer's time.

In addition to requiring a complex set of program instructions and taking a large amount of time to prepare, custom applications are highly prone to failure when changes are made to websites that the code accesses. More specifically, the navigational routes included in the custom applications may be rendered useless when information on an accessed website has changed. Consequently, custom applications are generally restricted to collecting unscripted content from websites. "Unscripted content," as used herein, may generally refer to website content which does not depend on client-side scripts in order to obtain the content. In other words, unscripted content may refer to information displayed on a website that is governed by the website's server.

In contrast, "scripted content" may refer to website content which includes one or more executable scripts from which to access the content. In this manner, scripted content may refer to information on a website which is susceptible to change without interface with the website's server. Such scripted content is sometimes referred to as dynamic hyper text markup language (DHTML), however, other markup languages known in the website development industry may be referred to as scripted content as well. Examples of information which may be desirable to display as scripted content may include, for instance, stock quotes from brokerage websites, prices of specific items from online commercial vendors and online auction sites, regional weather information, airline ticket information, shipment tracking information, news headlines on news organizations websites, and bank account balances. Other information may be displayed as scripted content as well or alternatively, depending on the design specifications of a website.

As such, it would be advantageous to develop systems and methods for automating world web navigation and content extraction. For example, it would be beneficial to develop systems and methods which extract content, particularly scripted content, from websites without user intervention. Such systems and methods may also be configured to navigate websites without user intervention as well. In addition to automating website navigation and content extraction, it would be advantageous to develop a system which can standardize web content and/or allow for the incorporation XPath query language within a custom application.

SUMMARY OF THE INVENTION

The problems outlined above may be in large part addressed by storage mediums and methods which are configured to automate world wide web navigation and content extraction from one or more websites, standardize web content and/or incorporate XPath query language within scripts. In particular, a storage medium having program components which are executable through a common application program interface and utilizable by a developer to write programming instructions is provided which incorporates at least one of the aforementioned capabilities. In addition, a storage medium having program instructions executable through a processor is provided which includes at least one of the aforementioned capabilities. A computer-implemented method for automating website navigation and content extraction is also provided.

In some cases, the storage medium having program components which are executable through a common application program interface (API) may include a first program component for navigating through one or more websites. In some embodiments, the first program component may be specifically configured for adaptively navigating through the one or more websites based upon program instructions written from the storage medium. More specifically, the first program component may, in some embodiments, include coding directives which are utilizable by a developer to write program instructions for conditionally navigating through the one or more websites and/or facilitating navigation through the one or more websites. In this manner, the storage medium may be used to navigate websites in different ways depending on the code written using the storage medium. In any case, the first program component may be for accessing data on websites. In some embodiments, the first program component may be used to access information other than what may be configured to be displayed on a browser as characterized by the structural layout of an accessed website.

In addition to the first program component, the storage medium may include one or more additional program components for extracting scripted content, as well as unscripted content, from the one or more websites. In particular, the storage medium having program components executable through a common application program interface may include a second program component for generating a model of logical structure of the website content. In addition, the storage medium may include a third program component for searching for information of interest within the model of logical structure. In some cases, the coding directives of the second program component may include program instructions which index web page content to increase the rate at which information is searched for within the model of logical structure. In addition or alternatively, the third program component may be specifically be configured to reference XPath query language. In other words, the program component used for querying the information of interest within the model of logical structure may include the XPath query language. In any case, the storage medium may further include coding directives for posting data upon a website. In addition or alternatively, the storage medium may include coding directives utilizable by a developer for developing event driven program instructions.

In some embodiments, the storage medium may further include coding directives for standardizing content on a website. Such coding directives may be in addition to the coding directives included in the second program component for generating the model of logical structures or may be within a different program component of the storage medium. In either case, the coding directives associated with standardizing content on a website may, in some embodiments, be utilizable by a developer to write program instructions for converting web content of non-standardized format on the web page into a well-formed format. In addition or alternatively, the standardizing coding directives may be utilizable by a developer to write program instructions for standardizing spaces within the web page content.

In some cases, the storage medium having program components which are executable through a common application program interface may include a means for interpreting different scripting languages. Such a means may, in some embodiments, be used for interpreting the program instructions written by the developer using the storage medium. In particular, the means may be configured to allow the developer to select a scripting language from a plurality of scripting languages with which to develop the program instructions. Consequently, by the inclusion of such a means, the developer is not restricted to writing the program instructions in a particular scripting language. The means for interpreting different scripting languages may also or alternatively be used to interpret scripting languages embedded within websites. In particular, the first program component, as described above, may include coding directives for recognizing a scripting language embedded within the one or more websites and executing the embedded scripting language using the aforementioned means for interpreting different scripting languages.

As noted above, a storage medium including program instructions which are executable using a processor is provided herein. Such a storage medium may include program instructions for navigating through a website to access information, parsing the accessed information into a model of logical structure and searching for content within the model of logical structure. In some cases, the program instructions may specifically be for adaptively navigating a website. In particular, the program instructions may be configured to conditionally navigate a website. In addition or alternatively, the program instructions may be configured to facilitate navigation. For example, the storage medium may specifically include program instructions for mimicking a browser authorized to access the website. In any case, the storage medium may further include program instructions for accessing the website without a user interface. In addition, the storage medium may include program instructions for standardizing web content. For example, the storage medium may include program instructions for tag balancing and/or space normalization. In yet other embodiments, the storage medium may additionally or alternatively include program instructions for indexing content during the parsing process such that information of interest may be queried faster from the generated model of logical structure.

In some embodiments, the storage medium including program instructions which are executable using a processor may further include program instructions for executing a scripting language embedded within the website such that information corresponding to the scripting language can be parsed into the model of logical structure. In addition, the storage medium may further include program instructions for automatically extracting the content to a target location. In general, the target location may be any location at which to store and/or display information, such as a text file, database or a website. In some cases, the storage medium may include program instructions for posting data upon the website. In addition or alternatively, the storage medium may include program instructions for monitoring the status of the accessed information on the web site. In such an embodiment, the storage medium may also include program instructions for sending an alert and/or automatically inducing the program instructions for navigating and extracting web content upon detecting a change in the status of the accessed information. In any case, the storage medium may be configured to simultaneously process multiple requests to extract content from one or more web pages.

A computer-implemented method for obtaining a collection of information from one or more web sites is contemplated herein. The computer-implemented method may include accessing the one or more web sites, partitioning contents on the one or more websites into a model of logical structure, querying the model of logical structure for information of interest and automatically extracting, independent of user intervention, the information of interest to a target location. In some cases, the computer-implemented method may further include executing a script embedded within the one or more websites prior to the step of querying. In addition, the computer-implemented method may include standardizing the contents on the one or more websites into a standard format prior to the step of partitioning. In particular, the computer-implemented method may include tag balancing or normalizing spaces within web content. In addition or alternatively, the computer-implemented method may include indexing content during the parsing step of the method such that information of interest may be queried faster during the querying step.

In some embodiments, the computer-implemented method may include navigating the one or more websites as the contents of websites are partitioned. In some cases, such a navigational step may be adaptive to the design layout of the websites. The computer-implemented method may, in some embodiments, further include posting data upon a website in response to the step of extracting the information to a target location. In addition or alternatively, the method may include monitoring the status of the contents on the one or more websites. In such an embodiment, the method may include sending an alert upon detecting a change in the status of the contents on the one or more websites. In addition or alternatively, the method may include performing the steps of partitioning, querying and automatically extracting upon detecting a change in the status of the contents on the one or more websites.

There may be several advantages to using the storage mediums and computer-implemented method provided herein. For example, the storage mediums and computer-implemented method provided herein offer a manner in which to automate world wide web navigation and content extraction without user intervention. Consequently, the time and money spent manually collecting information on the world wide web can be reduced or, in some cases, eliminated. In addition, the storage mediums and computer-implemented method described herein offer a manner in which to adaptively navigate websites. As a result, the program instructions which are written from the storage medium described herein having program components which are executable through a common application program interface may be less susceptible to crashing since obstacles incurred during navigation can be avoided or overcome.

Furthermore, the storage mediums and computer-implemented method described herein do not limit data collection to what may be displayed on a browser at any given time, increasing the amount of data that may be collected. Moreover, the storage mediums and computer-implemented method provided herein offer a manner in which to automatically extract scripted content from a web page. In this manner, all information available on websites, including unscripted and scripted content, may be accessed and extracted. The methods and storage mediums described herein further offer a manner in which to standardize content on websites such that information can be extracted in a comprehensible format. In addition, the storage medium described herein that has program components which are executable through a common application program interface may be configured to allow the XPath query language to be incorporated within program instructions written using the storage medium, reducing the length of code necessary to query desired information.

BRIEF DESCRIPTION OF THE DRAWINGS

Other objects and advantages of the invention will become apparent upon reading the following detailed description and upon reference to the accompanying drawings in which.

Figure 1:
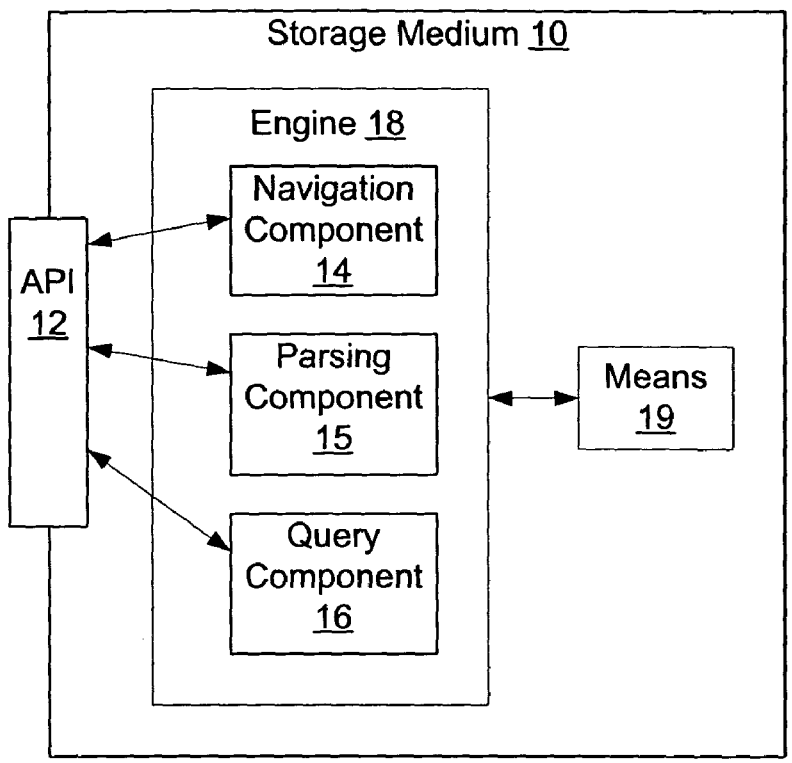
FIG. 1 depicts a schematic view of a storage medium having program instructions which are executable using a common application interface.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
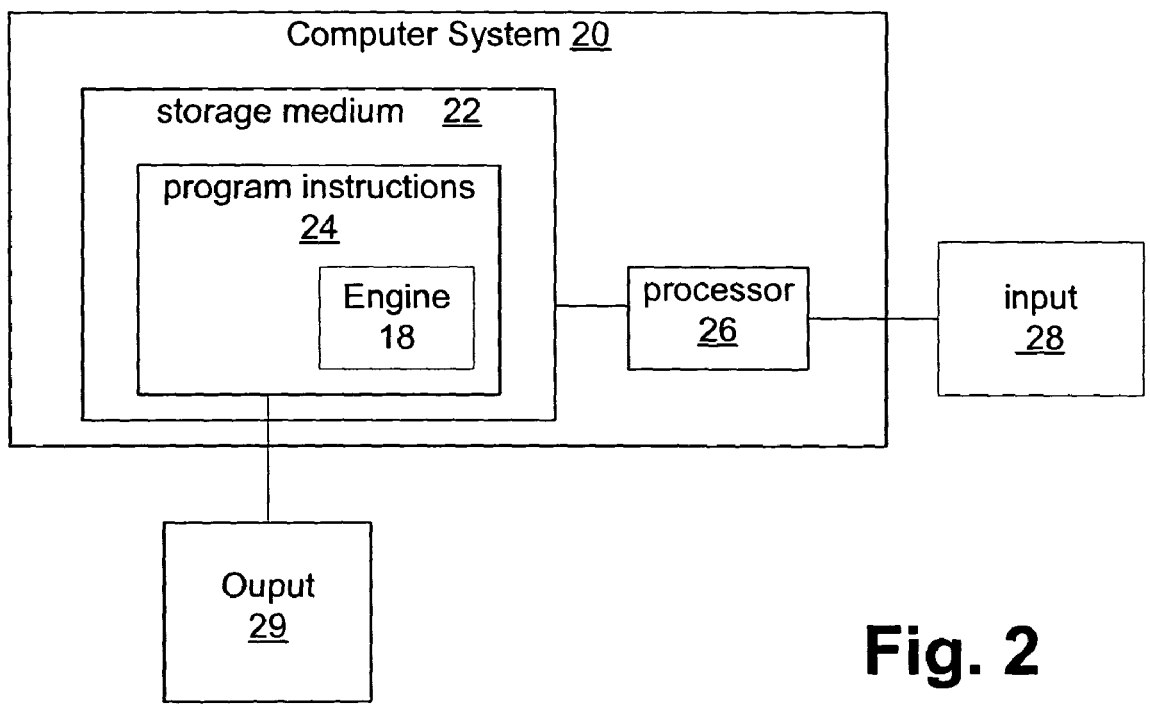
FIG. 2 depicts a schematic view of a computer system comprising a storage medium having program instructions which are executable using a processor of the computer system.
Figure 3:
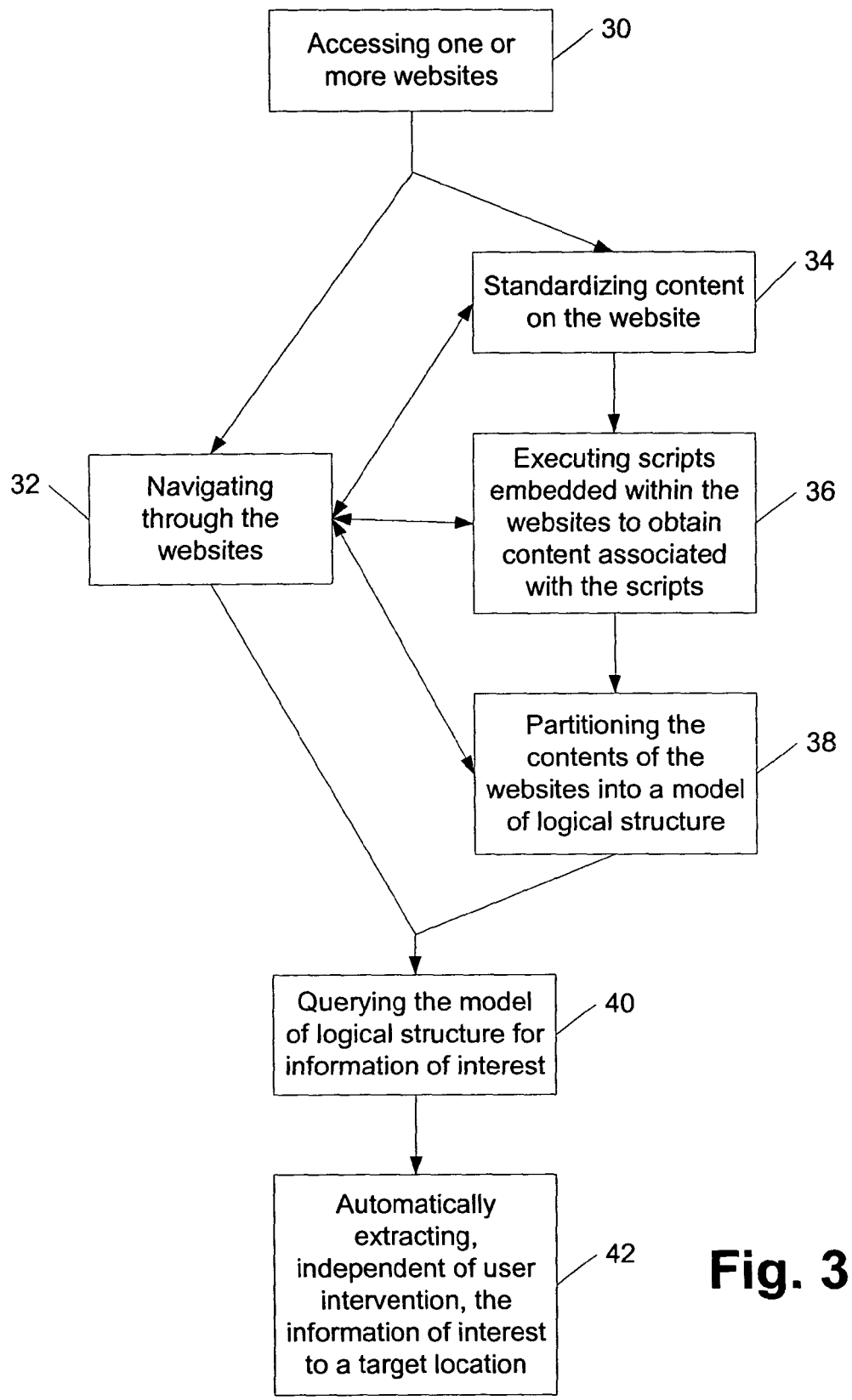
FIG. 3 depicts a flowchart of a method for automating world wide web navigation and content extraction.

Turning now to the drawings, exemplary embodiments of storage mediums and methods for automating world wide web navigation and content extraction are provided. In particular, FIG. 1 depicts a storage medium having program components which are executable through a common application program interface and which are utilizable by a developer to write programming instructions for world wide web navigation and content extraction. In such a context, the term "developer" may generally refer to any individual or system with the ability to write program instructions, including those individuals who have had training and those individuals who are self-taught. The term "user" may also be used herein to describe an individual or system with the ability to write program instructions. In other embodiments, however, the term "user" may refer to an individual or system which uses the storage medium described in reference to FIG. 2. FIG. 2 illustrates a storage medium having program instructions already prepared for world wide web navigation and content extraction and which are executable using a processor. FIG. 3 illustrates a method of world wide web navigation and content extraction which may be performed by the storage medium described in reference to FIG. 2 or by a program instructions written using the storage medium described in reference to FIG. 1.

In general, the term "storage medium," as used herein, may refer to any electronic medium configured to hold one or more set of coding directives and/or program instructions, such as a read-only memory, a random access memory, a magnetic or optical disk, or magnetic tape. As described in more detail below, a set of "coding directives" may make up a "program component" and may generally refer to directives for enabling a developer to write programming instructions to perform a particular function. In contrast, "programming instructions" may generally refer to commands within a program to perform a particular function. Consequently, the storage medium depicted in FIG. 1 may sometimes serve as a software development kit, while the storage medium depicted in FIG. 2 may generally serve as a medium comprising software.

As noted above, FIG. 1 depicts a storage medium having program components which are executable through a common application program interface. More specifically, FIG. 1 depicts storage medium 10 having navigation component 14, parsing component 15 and query component 16 which are executable through common application program interface 12 such that program instructions may be written to automate website navigation and content extraction. The terms "program component" and "programming module" may be used interchangeably herein and may generally refer to sets of coding directives for performing particular tasks (i.e., each engine corresponds to a distinct set of coding directives for performing different functions). In other words, the coding directives within program components may be invoked to develop program instructions with which to conduct functions.

In general, navigation component 14 may serve to navigate through one or more websites, parsing component 15 may serve to partition content from the websites into models of logical structure and query component 16 may serve to search the models of logical structure for information of interest. Storage medium 10 may include other engines or sets of coding directives for other tasks as well. Consequently, the storage medium described herein having program components which are utilizable by a developer to write programming instructions for world wide web navigation and content extraction is not restricted to the illustration of FIG. 1. For instance, storage medium 10 may, in some embodiments, include a set of coding directives for standardizing content on websites. In other embodiments, however, such a set of standardizing coding directives may be included in one of the program components illustrated in FIG. 1, such as parsing component 15 as described in more detail below.

In general, navigation component 14 may include a set of coding directives which are utilizable by a developer to write program instructions for navigating one or more websites. In particular, navigation component 14 may include a set of coding directives which are utilizable by a developer to write program instructions for traversing through different web pages of websites to access specific web content. "Web content," as used herein, may generally refer to any information that may be available through a website. In particular, "web content" may include hyper text markup language (HTML) or extensible markup language (XML) information on a web page or documents such as Adobe Portable Document Format (pdf) files. In some cases, program instructions may be written using the coding directives of navigation component 14 to outline a specific navigational route with which to obtain desired web content. In some embodiments, however, navigation component 14 may include coding directives for adaptively navigating through one or more websites. More specifically, the coding directives of navigation component 14 may be used to write program instructions which outline directives or rules for navigating through the websites based on their structure and/or design specifications as described in more detail below. In yet other embodiments, however, navigation component 14 may not include adaptive coding directives such that the complexity of the program component may be minimized.

In any case, "navigational route," as used herein, may generally refer to a series of links to execute and/or forms to complete within a website by which to obtain web content. In particular, following a navigational route may include selecting links or may include entering information into forms provided within a websites to access web content. For example, in some embodiments, information, such as personal contact information or authentication credentials (e.g., user identifications or passwords) may need to be entered prior to accessing web content. Such personal contact information or authentication credentials may be included within the program instructions using navigation engine 14 or may be entered at a program interface when the program instructions have been executed.

As noted above, navigation component 14 may include coding directives for adaptively navigating through one or more websites. In some cases, the coding directives of navigation component 14 may be used to write program instructions which conditionally navigate through one or more websites, or more specifically, navigate through one or more websites with if, then and looping (e.g., for, while, etc.) directives. In particular, program instructions may be written using the coding directives of navigation component 14 which contemplate subsequent navigational steps based upon options available on a particular web page. In other words, program instructions may be written which recognize web content on a web page and direct the navigational route based on the web content. For instance, program instructions may be written to navigate through one or more websites to extract content regarding weather predictions within a particular region and timeframe. Such program instructions may be configured to navigate through websites by recognizing web content (such as keywords or dates, for example) which correspond to the requested information. In this manner, the program instructions do not necessarily have to outline a specific navigational route to follow. In addition, the script may be used for websites with different structural hierarchies depending on the content to be accessed. Moreover, the script is not dependent on the structure of the website staying the same. In some cases, however, the coding directives of navigation component 14 may be additionally or alternatively utilizable by a developer to outline specific navigational routes (i.e., specifying every link to follow to access desired web content) as noted above.

In some embodiments, the coding directives of navigation component 14 may additionally or alternatively be used to write program instructions which facilitate the navigation of websites, thereby allowing another manner in which to adaptively navigate websites. In other words, coding directives of navigation component 14 may be configured to enhance navigation through websites such that a navigational route may be simplified and/or obstacles which may be encountered along a navigational route may be avoided or overcome. For example, in some cases, the coding directives included within navigation component 14 may be used to write program instructions which dynamically change a browser identity. In this manner, the program instructions may be used to mimic a browser with which a website allows access.

Examples of other parameters that may be altered to facilitate navigation of websites include, but are not limited to:
   whether cookies are accepted
   whether redirects are followed
   whether refresh requests are accepted
   whether scripted content on web pages is/are executed
       enablement or disablement of scripted content processing with errors
   whether exceptions on web errors (e.g., request/response errors, etc.) are thrown
   whether events on web errors are thrown
   the use of proxy servers (i.e., starting or stopping the use of proxy servers as well as changing proxy servers)
   dynamically changing parameters in the uniform resource locator (url) of an anchor/link
   manipulating form controls including hidden controls In some embodiments, the coding directives of navigation component 14 may be utilizable by a developer to selectively write program instructions associated with facilitated navigation. More specifically, the coding directives of navigation component 14 may be used to write program instructions which facilitate navigation to be specific to particular websites and/or time frames. For example, a developer may use the coding directives of navigation component 14 to write program instructions with one or more of the alterations listed above for one or more specific websites, which may or may not include all of the websites accessed during a navigational route. In addition or alternatively, a developer may use the coding directives of navigation component 14 to write program instructions with one or more of the alterations listed above for a specific time period during which the program instructions are executed. In this manner, program instructions may be written which may essentially "turn on" and "turn off" different parameters by which to navigate websites.

Regardless of whether navigation component 14 is used by a developer to write program instructions which outline a specific navigational route or an adaptive navigational route, navigation component 14 may generally include coding directives for accessing one or more websites to navigate. In other words, the coding directives within navigation component 14 may be used to create a session by which to access one or more websites to navigate. In some cases, the set of coding directives used to access websites may be used to specifically reference particular sites or may be used to search for websites using keywords. Such specific sites and/or keywords may be written into the program instructions, allowing the websites to be accessed independent of user intervention. In other embodiments, however, program instructions may be written to access specific websites and/or keywords as entered by a user.

In an embodiment in which the navigation of the websites is independent of user intervention, the coding directives in storage medium 10 which are used to access websites may, in some embodiments, be configured to access information which may not be actively available on a browser at a given time. In particular, storage medium 10 may include coding directives which are utilizable by a developer to write program instructions for accessing content other than what may be configured to be displayed on a browser as characterized by the structural layout of a website. For example, in some cases, a website may have access to an enormous amount of content pertaining to a particular subject matter, but the website may be designed to only display a limited amount of the content in order to minimize the complexity and bandwidth used by the website. The storage medium described herein, however, may include coding directives utilizable by a developer to write program instructions for accessing the content which is available from a website but is not displayed due to design limitations. Such coding directives may particularly allow a developer to employ the anchor-links used to access the content displayed on the browser to the other information available through the website. Consequently, the storage mediums and computer-implemented method described herein will increase the amount of data that can be collected from the world wide web as compared to collecting information manually or through custom applications.

In some embodiments, navigation component 14 may include coding instructions for monitoring the status of content on one or more websites. In particular, navigation component 14 may include coding instructions which are utilizable by a developer to create program instructions with which to detect whether content or the location of content on a website has changed. In some embodiments, navigation component 14 may further include coding instructions for sending an alert and, in some embodiments, additionally or alternatively executing the program instructions written by the developer upon notification of a particular event. In particular, navigation component 14 may include coding instructions which are utilizable by a developer to create program instructions for sending a notification when content or the location of content upon a particular website has changed. In addition or alternatively, navigation component 14 may include coding directives which are utilizable by a developer to create program instructions which navigate and extract content from a website upon detecting a change in content or the location of content upon a particular website. Such program instructions may be configured to be automatic (i.e., implemented without intervention from a user of the program instructions) or may be invoked by command specified in the program instructions. In any case, the event driven program instructions may be associated with any occurrence in which the content or location of content on a website has changed, such as a refresh or a redirection of the website. Other events may include, but are not limited to scripted content errors, request errors, response errors, and scripted content alerts.

As noted above, storage medium 10 may further include parsing component 15 to partition content from websites into a model of logical structure. In general, a model of logical structure defines the logical structure of a document and the way the document is accessed and manipulated. One model currently available is the Document Object Model (DOM) authored by the World Wide Web Consortium (W3C). Regardless of the model used, parsing component 15 may, in part, be used to extract scripted and/or unscripted content from the one or more websites. Query component 16 may be also used for content extraction as described in more detail below. As noted above, unscripted content refers to web content which does not depend on embedded client-side scripts and, therefore, typically includes web content which may be directly parsed into models of logical structure. In contrast, however, scripted content refers to content in which a scripting language needs to be executed in order to access the content. JAVASCRIPT (™Netscape Comm. Corp., Mountain View, Calif.) is a well known cross-platform, object-based scripting language for client and server applications. Consequently, parsing engine 14 may, in some cases, include coding directives which are utilizable for writing program instructions to execute scripts on a website such that scripted web content may be parsed into models of logical structure. Alternatively, such coding directives may be incorporated within a different engine of storage medium 10.

In any case, a set of programming instructions which are configured to execute scripting languages may be generally be referred to herein as an "interpreter." A set of programming instructions configured to specifically execute web scripting languages may be referred to herein as a "back-end interpreter," while a "front-end interpreter" may be refer to a set of programming instructions configured to execute scripting languages other than those used for scripted content on websites. For example, a front-end interpreter may be used to execute program instructions written using the coding directives included within storage medium 10 and in a separate application program interface than common application program interface 12. In any case, an interpreter may be facilitated through a factory based architecture or through any other architecture used within the software development industry.

As shown in FIG. 1, storage medium 10 may include means 19 for interpreting different scripting languages. In some embodiments, means 19 may be used for interpreting the program instructions written by the developer using the storage medium and, therefore, may serve as a front-end interpreter. In this manner, means 19 may be configured to allow the developer to select a scripting language from a plurality of scripting languages with which to develop the program instructions. Consequently, by the inclusion of means 19 within storage medium 10, the developer is not restricted to writing the program instructions in a particular scripting language. In some cases, means 19 for interpreting different scripting languages may be used to interpret scripting languages embedded within websites and, therefore, may additionally or alternatively serve as a back-end interpreter. In such an embodiment, navigational component 14 may include coding directives for recognizing a scripting language embedded within the one or more websites and executing the embedded scripting language using means 19.

In some cases, storage medium 10 may include coding directives for standardizing website content, including both unscripted and scripted content. Such coding instructions may be incorporated within parsing component 15, as a filter, for example, or may be incorporated within their own program component. In any case, "standardizing," as used herein, may generally refer to modifying the arrangement of web content into a comprehendible and standard format. For example, in some embodiments, the standardizing coding directives used for automatically converting web content of non-standardized format on the web page into a well-formed format, which is sometimes referred to as tag balancing. More specifically, the standardizing coding directives may be used to write programming instructions which modify web content to follow the standard structure for HTML or XML. In addition or alternatively, the standardizing coding directives may be used for automatically removing unnecessary white spaces within the web page content, such as but not limited to spaces, line feeds and carriage returns. In particular, the standardizing coding directives may be used to write programming instructions which remove series of white spaces within web content which do not contribute to the overall layout of the content. Such a removal process is sometimes referred to as space normalization.

As noted above, storage medium 10 may include query component 16 for searching for information of interest within the model of logical structure. In some embodiments, parsing component 15 may include program instructions for indexing web page content such that the rate at which information is searched for using the program instructions written using query component 16 may be enhanced or, more specifically, increased. Such program instructions may be programmed into the coding directives of parsing component 15 and, therefore, may be automatically included within any program instructions written using the coding directives of parsing component 15. Consequently, a developer does not necessarily have to write program instructions to specifically index content. In some cases, query component 16 may specifically be configured to reference XPath query language. Alternatively stated, the program instructions written for querying the information of interest within the model of logical structure may include XPath query language, allowing query program instructions to be developed more quickly.

In some cases, storage medium 10 may further include a program component for sending the queried information to a target location. In general, the target location may be any location at which to store and/or display information, such as a text file, database or a website. In some embodiments, storage medium 10 may further include a program component for sending information to a website, particularly one which has been navigated using the program instructions described above. In particular, storage medium 10 may include a program component having coding directives utilizable by a developer to create program instructions by which to post data on a website. In some cases, such coding directives may be included within navigation component 14. However, in other embodiments the coding directives may be incorporated within a program component distinct from navigation component 14.

FIG. 1 illustrates program components 14, 15 and 16 within engine 18 of storage medium 10. In general, engine 18 may serve to store the coding directives of all of the program components included within storage medium 10 such that the coding directives may be accessed and included within program instructions written using storage medium 10. In particular, engine 18 may allow the coding directives outlined in program components 14, 15 and 16 to be collectively included within program instructions developed from storage medium 10 such that particular functions of the program components may be performed. An exemplary set of program instructions which include engine 18 is illustrated in FIG. 2 and described in more detail below. It is noted that the inclusion of engine 18 within program instructions written using storage medium 10 may also include common API 12 with which to access the program components of the engine as described below in reference to FIG. 2.

As noted above, a storage medium having program instructions executable through a processor is illustrated in FIG. 2. In particular, FIG. 2 illustrates storage medium 22 coupled to processor 26 within computer system 20 such that output 29 may be generated from input 28. More specifically, input 28 may be transmitted to computer system 20 to execute program instructions 28 within storage medium 22. Input 28 may be an automated signal to execute program instructions 28 or may include an execution command from a user of computer system 20. More specifically, storage medium 22 may, in some embodiments, be preprogrammed to extract particular information of interest without intervention from a user of computer system 20. In other embodiments, however, storage medium 22 may be configured to search for information of interest based on information provided by the user of computer system 20. For example, the user of computer system 20 may communicate keywords to search for particular websites through which to navigate and extract information of interest. In any case, storage medium 22 may be configured to simultaneously process multiple requests to extract content from websites. As noted above, the term "user" when used in reference to FIG. 2 may generally refer to an individual or system that uses storage medium 20 to navigate and extract content from websites. Since storage medium 20 includes program instructions already written to perform such navigation and extraction functions, the term "user" in such a context does not necessarily refer to an individual or system having the ability to write program instructions as may be inferred when the term "user" is used in reference to the storage medium described in reference to FIG. 1.

In addition, storage medium 22 may be configured for any application in which navigation and content extraction from websites is desirable. For example, storage medium 22 may be specifically configured to navigate brokerage websites to extract stock quotes, navigate online commercial vendor sites and/or online auction sites to extract prices of specific items, navigate websites to extract regional weather information, navigate airline and/or travel sites to extract airline ticket information, navigate websites to extract shipment tracking information, navigate news organizations websites to extract news headlines, and/or navigate bank sites for bank account balances. Other applications may also or alternatively be configured within storage medium 22, depending on the type of information to be extracted. Consequently, storage medium 22 is not restricted to the applications recited herein and may generally be used as a vertical for any industry.

In general, program instructions 24 may be configured to perform the functions discussed above in reference to the program instructions developed from the coding directives of the program components in storage medium 10. In some embodiments, program instructions 24 may be specifically developed from a storage medium having program components which are executable through a common application program interface such as described in reference to FIG. 1. In other embodiments, however, program instructions 24 may be developed independent of such a storage medium. In either case, program instructions 24 may include program instructions for accessing websites. In particular, program instructions 24 may be used to access pre-selected websites or may be used to search for and access websites using keywords. Such specific sites and/or keywords may be written into program instructions 24, allowing the websites to be accessed independent of user intervention. In other embodiments, however, program instructions may be written to access specific websites and/or keywords as entered by a user.

In either case, program instructions 24 may further include program instructions for navigating through the accessed websites. In some embodiments, program instructions 24 may include program instructions for following a specific navigational route through the websites. In other cases, however, program instructions 24 may include instructions for adaptively navigating through websites. For example, program instructions 24 may, in some embodiments, include program instructions for mimicking a browser authorized to access a desired website or any other directive which may facilitate website navigation. Examples of such directives are listed above in reference to parsing component 15. In some cases, program instructions 24 may additionally or alternatively include program instructions for conditionally navigating websites. A description of such program instructions are described in more detail above in reference to parsing component 15 as well.

In some embodiments, program instructions 24 may be further configured to access information which may not be actively available on a browser at a given time. In particular, program instructions 24 may include instructions for accessing content other than what may be configured to be displayed on a browser as characterized by the structural layout of a website as described in more detail above in reference to navigation component 14. In some cases, program instructions 24 may include instructions for monitoring the status of content on one or more websites. In such embodiments, program instructions 24 may further be configured to send alerts or execute instructions for navigating and extracting content upon detecting a change in content or the location of content on a website as described above in reference to navigation component 14.

In addition to access and navigational program instructions, program instructions 24 may include program instructions for parsing and/or standardizing website content as well as querying models of logical structure generated from the parsing components for information of interest. More detailed descriptions of the functions of such program instructions are described above in reference to storage medium 10. Program instructions 24 may also include program instructions for filing the queried information of interest to a target location. In this manner, program instructions 24 may include program instructions for extracting content from one or more websites to a target location. In some embodiments, program instructions may also include instructions for posting information on websites. Such information may be in a scripted or unscripted format and may be sent to websites accessed through the navigational program instructions or may be sent to other websites.

As noted above, program instructions written using a storage medium similar to the one described in reference to FIG. 1 may include an engine of the program components included within the storage medium such that the particular functions associated with the program components may be performed. Consequently, program instructions 24 may, in some embodiments, include engine 18 as shown in FIG. 2. In particular, embodiments in which program instructions 24 are developed using storage medium 10, program instructions 24 may include engine 18. In addition, program instructions 24 may further include common API 12 by which to access the program components within engine 18. API 12, in such an embodiment, however, may not be accessible to other components within computer system 20. In this manner, users of storage medium 22 may not necessarily have access to common API 12.

FIG. 3 illustrates a flowchart of a computer-implemented method for navigating and extracting content from websites. In general, the method described herein is preferably carried out through the program instructions. More specifically, the method described herein may include navigating and extracting content from websites through the use of one or more algorithms and, therefore, may be best implemented through a computer. Consequently, the method described herein may sometimes be referred to as a "computer-implemented method". In other cases, however, the method described herein may be more generally referred to as the "method." It is noted that the use for the two terms is not mutually exclusive and, therefore, may be used interchangeably. As shown in FIG. 3, the computer-implemented method may include step 30 in which one or more websites are accessed. Such a step may be manually performed by a browser user or may be automatically performed by program instructions similar to those described in reference to FIG. 2. The computer-implemented method may further include step 32 in which the websites are navigated. Similar to step 30, step 32 may be performed manually by a browser user or, more preferably, automatically by program instructions, such as those described in reference to FIG. 2.

As shown in FIG. 3, the computer-implemented method may further include steps 34, 36 and 38 in which content within accessed websites is respectively standardized, obtained from executed scripts and partitioned into models of logical structure. Such processes are described in more detail above in reference to storage mediums 10 and 22. Steps 34, 36 and 38 may be performed in sync with navigational step 32 and, therefore, are depicted to be performed concurrently with step 32 in FIG. 3. Although steps 34, 36 and 38 are shown in a sequential order, steps 34, 36 and 38 may be formed in any order, depending on the amount and type of information on a website. In particular, some content may already be in standard form and may simply need to be partitioned. In cases in which the content is scripted, the content may be obtained through the execution of a corresponding script language and subsequently partitioned as noted in steps 36 and 38, respectively. In cases in which the content is unscripted, however, step 36 may be skipped and the content may be partitioned separate or in combination with the scripted content. In yet other embodiments, step 34 may be omitted from the method and the web content may be partitioned as it is formatted on the website.

In any case, the computer-implemented method may further include step 40 in which the model of logical structure generated in step 38 is queried for information of interest. Such a step is described in more detail above in reference to query component 16 in FIG. 1. As shown in FIG. 3, the computer-implemented method may also include step 42 in which the information of interest queried in step 40 is automatically extracted, independent of user intervention, to a target location. As noted above, the target location may generally be any location at which to store and/or display information, such as a text file, database or a website. In some cases, the computer-implemented method may also include posting data to a website. Such a step may be performed at any point within the method depicted in FIG. 3, however, such a step may be particularly advantageous in response to the content extracted from the websites as described in reference to step 42. In some cases, the computer-implemented method may also include monitoring the status of content on one or more websites. In such an embodiment, the computer-implemented method may include sending alerts upon detecting a change in content or the location of content on a website. In addition or alternatively, the method may be directed to repeat steps 30-42 upon detecting such a change.

It will be appreciated to those skilled in the art having the benefit of this disclosure that this invention is believed to provide storage mediums and a computer-implemented method for automating world wide web navigation and content extraction. Further modifications and alternative embodiments of various aspects of the invention will be apparent to those skilled in the art in view of this description. For example, the storage medium described herein having program instructions executable using a processor may include program instructions for obtaining any information that is available on the world wide web. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A storage medium comprising a Software Development Kit (SDK) having program components which are executable through a common application program interface, wherein the program components comprise:
a first program component having coding directives which are utilizable by a developer to write program instructions that are executable by a processor for adaptively navigating through one or more websites,
wherein adaptively navigating includes adjusting parameters used to dynamically avoid or overcome obstacles encountered along a navigational route, where the parameters adjusted includes at least one of the following parameters—changing browser identity, executing scripted content on web pages or manipulating form controls;
one or more additional program components having coding directives which are utilizable by a developer to write program instructions that are executable by a processor for:
extracting scripted content, wherein at least some of the content is available, but not displayed, from the one or more websites including loading and executing the scripted content; and
storing the extracted scripted content at a target location.

2. The storage medium of claim 1, wherein the coding directives of the first program component are utilizable by a developer to write program instructions that are executable by a processor for conditionally navigating through the one or more websites.

3. The storage medium of claim 1, wherein the coding directives of the first program component are utilizable by a developer to write program instructions that are executable by a processor for facilitating navigation through the one or more websites.

4. The storage medium of claim 3, wherein the coding directives of the first program component are utilizable by the developer to selectively write the program instructions associated with facilitated navigation for specific timeframes.

5. The storage medium of claim 1, wherein the coding directives of the one or more additional program components are further utilizable by a developer to write program instructions that are executable by a processor for standardizing the scripted and unscripted content.

6. The storage medium of claim 1, wherein the coding directives of the one or more additional program components are further utilizable by a developer to write program instructions that are executable by a processor for generating a model of logical structure of the scripted and unscripted content.

7. The storage medium of claim 1, wherein the coding directives of the first program component are further utilizable by a developer to write program instructions that are executable by a processor for:
recognizing a scripting language embedded within the one or more websites; and
executing the embedded scripting language using an interpreter.

8. The storage medium of claim 1, wherein the coding directives of the first program component are utilizable by a developer to write program instructions that are executable by a processor for accessing data other than what may be configured to be displayed on a browser as characterized by a structural layout of an accessed website.

9. The storage medium of claim 1, wherein the coding directives of the one or more program components are further utilizable by a developer to write program instructions that are executable by a processor for posting data on the one or more websites.

10. The storage medium of claim 1, wherein the coding directives of the first program component and one or more additional program components are utilizable by a developer to write event driven program instructions.

11. A Software Development Kit (SDK) comprising program instructions executable using a processor for:
adaptively navigating through one or more websites to access information,
wherein adaptively navigating includes adjusting parameters used to dynamically avoid or overcome obstacles encountered along a navigational route, where the parameter adjusted includes at least one of the following parameters—changing browser identity, executing scripted content on web pages or manipulating form controls;
parsing the accessed information into a model of logical structure;
loading and executing a scripting language embedded within the one or more websites such that results of the script execution can be parsed into the model of logical structure;
searching for content, at least some of which is available but not displayed on said one or more websites within the model of logical structure;
extracting, independent of user intervention, the searched content from the one or more websites; and
storing, independent of user intervention, the extracted content at a target location.

12. The storage medium of claim 11, wherein the program instructions are further for accessing the website without a user interface.

13. The storage medium of claim 11, wherein the program instructions are further for posting data upon the website.

14. The storage medium of claim 11, wherein the program instructions are for monitoring the status of the accessed information on the website, and for sending an alert upon detecting a change in the status of the accessed information.

15. A computer-implemented method for obtaining a collection of information from one or more websites, comprising:
accessing the one or more websites;
partitioning contents on the one or more websites into a model of logical structure;
loading and executing a script embedded within the one or more websites such that results of the script execution can be parsed into the model of logical structure;
querying the model of logical structure for information of interest;
automatically extracting, independent of user intervention, the information of interest from the one or more websites;
automatically storing, independent of user intervention, the extracted information of interest at a target location; and
adaptively navigating one or more websites based, in part, on the extracted information of interest;
wherein adaptively navigating includes adjusting parameters used to dynamically avoid or overcome obstacles encountered along a navigational route where the adjusted parameter includes at least one of the following parameters—changing browser identity, executing scripted content on web pages or manipulating form controls.

16. The computer-implemented method of claim 15, further comprising standardizing the contents on the one or more websites into a standard format prior to the step of partitioning.

17. The computer-implemented method of 15, further comprising posting data upon a website in response to the step of extracting the information of interest from the one or more websites.

18. The computer-implemented method of claim 15, including monitoring the status of the contents on the one or more websites, and further comprising performing the steps of partitioning, querying, automatically extracting, and automatically storing upon detecting a change in the status of the contents on the one or more websites.

* * * * *